United States Patent [19]

Buresch

[11] Patent Number: 5,766,776
[45] Date of Patent: Jun. 16, 1998

[54] STRIP SHAPED OR WIRE-SHAPED COMPOUND MATERIAL

[75] Inventor: Isabell Buresch, Illertissen, Germany

[73] Assignee: Wieland-Werke AG, Ulm, Germany

[21] Appl. No.: 568,181

[22] Filed: Dec. 6, 1995

[30] Foreign Application Priority Data

Dec. 7, 1994 [DE] Germany ............ 44 43 461.8

[51] Int. Cl.$^6$ .................. B32B 15/20; C22C 13/00
[52] U.S. Cl. ................. 428/642; 428/647; 428/939; 420/557
[58] Field of Search ................. 428/647, 642, 428/929, 939, 674; 420/557, 562, 577, 589

[56] References Cited

U.S. PATENT DOCUMENTS

| | | | |
|---|---|---|---|
| 3,481,795 | 12/1969 | Lane | 420/557 |
| 3,881,919 | 5/1975 | Hyner et al. | 420/562 |
| 4,749,626 | 6/1988 | Kadija et al. | 428/647 |
| 4,795,682 | 1/1989 | Turner et al. | 420/557 |

FOREIGN PATENT DOCUMENTS 546179  12/1942  United Kingdom ............ 420/557

OTHER PUBLICATIONS

R. Duckett et al., "Influence of Solder Compositions . . .", Electroplating and Metal Finishing, pp. 13–14, 16, 18–20, May 1976.

Chemical Abstract No. 101:16031, Magnetic properties of transition metal solutes in liquid indium, tin, antimony, and tellurium., (no month) 1984.

Chemical Abstract No. 101:45431, Electrodeposition of a tin–cobalt alloy, (no month) 1984.

Chemical Abstract No. 102:14064, Electroplating of bright tin–cobalt alloys, (no month) 1984.

Chemical Abstract No. 106:92491, Electrodeposition of a tin–cobalt alloy, (no month) 1985.

Chemical Abstract No. 127:196846, Electroplating of bright tin–cobalt–zinc alloy from a weak acid solution, (no month) 1997.

*Primary Examiner*—John J. Zimmerman
*Attorney, Agent, or Firm*—Flynn, Thiel, Boutell & Tanis, P.C.

[57] ABSTRACT

A strip-shaped or wire-shaped compound material with a base material of copper or a copper alloy and with a moltenly applied surface coating of a tin alloy, whereby between both materials there is formed an intermetallic phase. The inventive additive of 0.001 to 0.5% cobalt to pure tin or a tin alloy results in a particularly fine-granular, smooth intermetallic phase and not only a higher total layer hardness, a better bendability, a higher shearing resistance and a lower elasticity module, but, in particular, also a high creeping resistance. The compound material can be utilized within a wide range for electromechanical and electrooptical structural elements, plug connectors and soldered structural parts.

13 Claims, 4 Drawing Sheets

STRIP SHAPED OR WIRE-SHAPED COMPOUND MATERIAL

FIELD OF THE INVENTION

The invention relates to a band-shaped or wire-shaped compound material.

BACKGROUND OF THE INVENTION

In particular, for plug connectors, tinned copper and copper alloy strip offer significant advantages in comparison to a bright strip with a subsequent coating of the finished parts. To improve in particular the corrosion resistance and hardness of the surface layer, it has become known to add to the tin layer a number of elements such as, for example, Ag, Al, Sb, Cu, Zn, P (compare, for example, DE-OS 4 005 836). An intermetallic phase (IMP) is thereby formed, which in comparison to the CuSn intermetallic phases, is slightly more fine-granular, see Table 1 (compare, for example, also the WIELAND-Production Information "A new variation of the hot-tin plating: Sn PLUS", Edition 5/94).

A disadvantage of this intermetallic phase is that it is very irregularly constructed and the grains have partly a stalk-shaped structure (compare FIG. 1, which shows the construction of the IMP after the tinning of a bronze band with SnNi1, 4Zn1, 24Ag0, 14Sb4.4). Since this IMP, however, for example in plug connectors, represents after several plug and pull operations a sliding surface, and in contact elements a contact surface, this type of construction of the IMP is very unsuitable. Stalk-shaped crystallites break off during rubbing operations and make this construction more difficult just like the irregular construction, which has a high degree of roughness.

SUMMARY OF THE INVENTION

The basic purpose of the invention is therefore to make available such a tin alloy which avoids the described disadvantages.

The purpose is attained according to the invention by a tin alloy consisting of 0.001 to 5% cobalt, the remainder being tin and usual impurities (the percentage informations refer thereby to the weight).

It has been surprisingly found that the cobalt addition to pure tin leads to a particularly fine-granular, smooth intermetallic phase, which does not only results in a higher total layer hardness, a better bendability, a higher shearing resistance and lower elasticity module (E-module), but in particular results also in a high creep resistance, whereby the thermic creep resistance is to be understood as the resistance against time and temperature dependent deformation processes occurring during long-term stress.

Preferred is a tin alloy, which consists of 0.003 to 0.5% cobalt, the remainder being tin and the usual impurities.

The described effect, however, is not only achieved in the case of pure tin, but also in the already known tin alloys, which contain at least one element selected from the group consisting of antimony, silver, nickel, zinc, copper, phosphorus, selenium, tellurium, aluminum, iron up to a total of 10%.

The particular fine-grain quality occurs also when the tin alloy contains in addition 0.1 to 57%, in particular 0.1 to 20%, bismuth or 0.1 to 50.0%, in particular 0.1 to 35%, indium, or in addition 0.1 to 20%, in particular 0.1 to 5% bismuth, and 0.05 to 35%, in particular 0.05 to 3% indium.

Bismuth and indium effect, just like antimony, an additional increase in hardness through a solid solution hardening.

The grain size of the intermetallic phase is 1.1 to 11 μm, preferably 1.1 to 8.8 μm. After heat aging, the grain size of the intermetallic phase should not exceed 15 μm.

The base material consists in particular of copper, tin, bronze, brass, special brass, CuNi, CuMn, CuNiSi, CuAl alloys or low alloyed Cu alloys, for example CuFe2P.

Because of the excellent characteristics, the tinned compound material of the invention can be used preferably for structural parts which, during manufacture are subjected to bending and shearing stress, for example, electromechanical and electrooptical structural elements, semiconductor structural elements, plug connectors and soldered structural parts, and structural parts which during use are continuously subjected to pressure, shearing, and frictional stress, as, for example, electromechanical and electrooptical structural elements, contact elements, plug connectors and soldered structural parts.

DETAILED DESCRIPTION

The invention will be discussed in greater detail in connection with the Table 1 and following exemplary embodiments.

Figure 1:
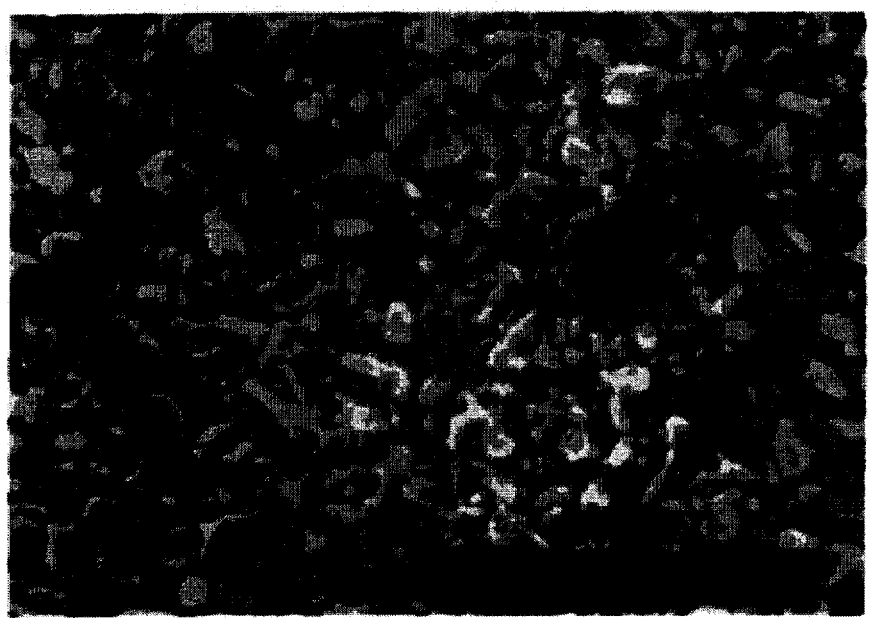
FIG. 1 is a photomicrograph of an intermetallic phase after tinning of a bronze band with SnNi1, 4Zn1 , 24Ag0, 14Sb4.4.
Figure 2A:
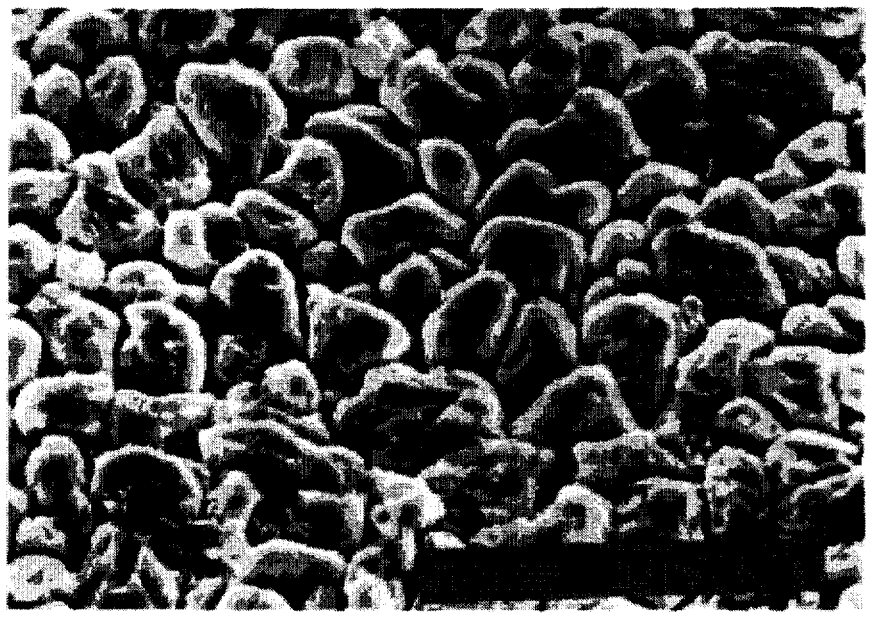
FIGS. 2a/2b are each photomicrographs showing a fine grain effect of a cobalt addition to pure tin.
Figure 2B:
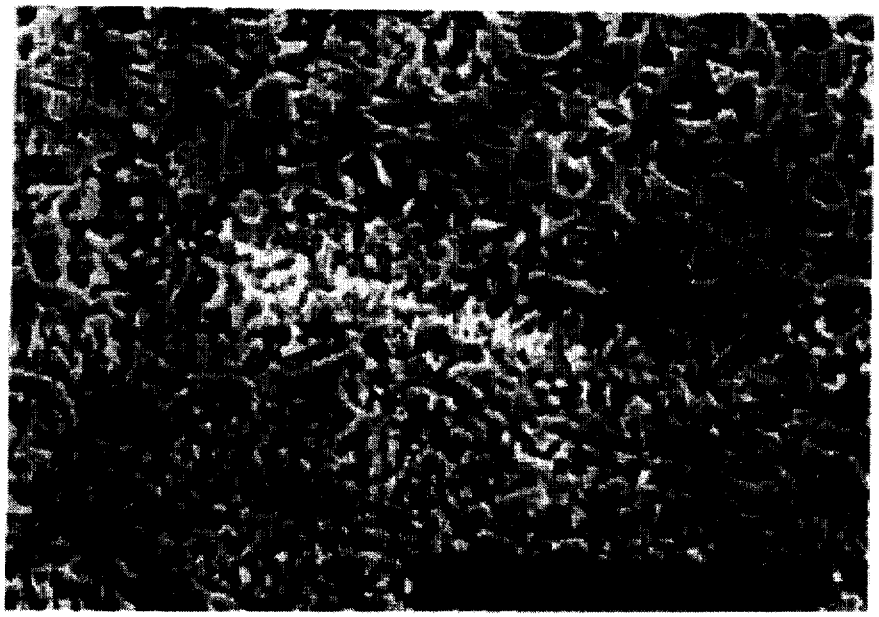
Figure 3A:
FIGS. 3a/3b are each photomicrographs showing a fine grain effect of a cobalt addition to SnBi5In3 alloy.
Figure 3B:
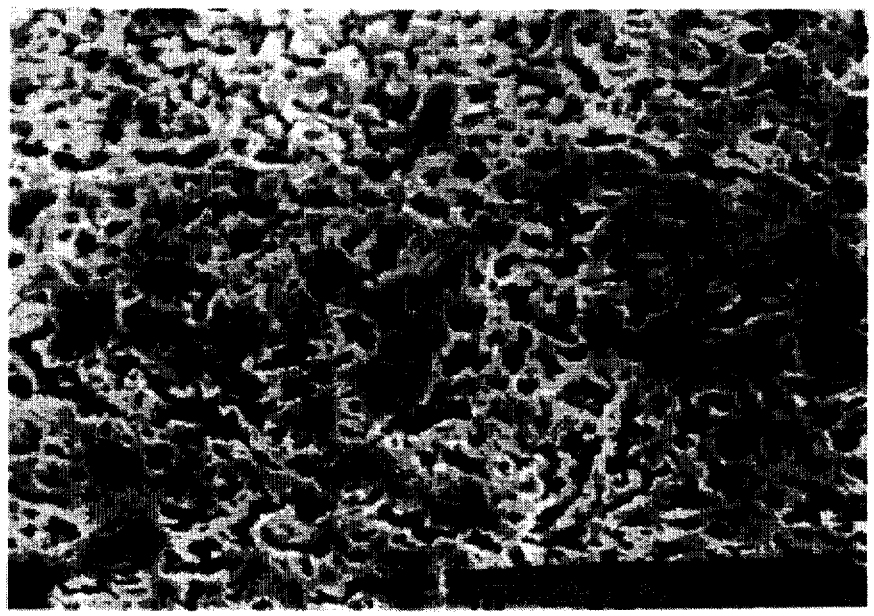
Figure 4A:
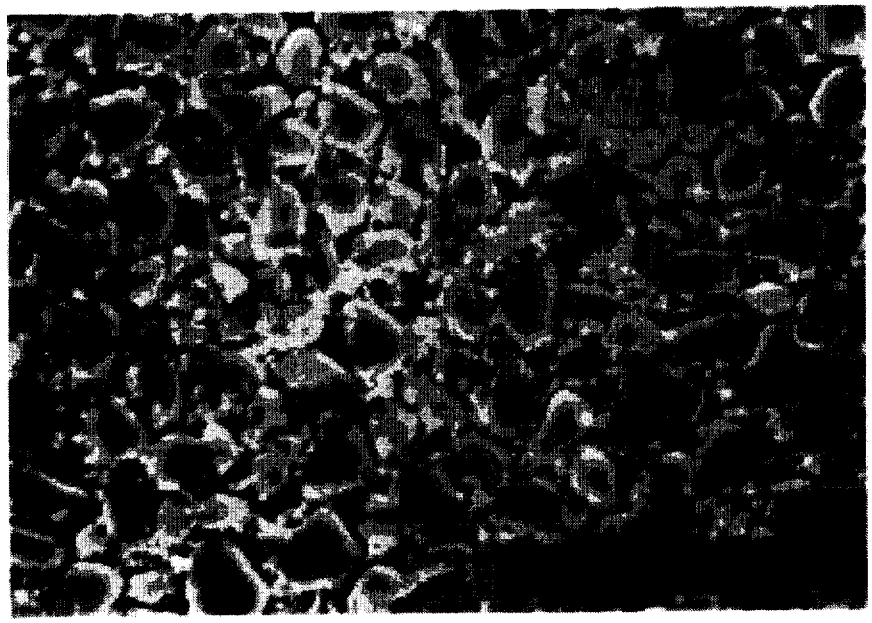
FIGS. 4a/4b are each photomicrographs showing a fine grain effect of a cobalt addition to a SnAg0.5Sb1.0 alloy.
Figure 4B:
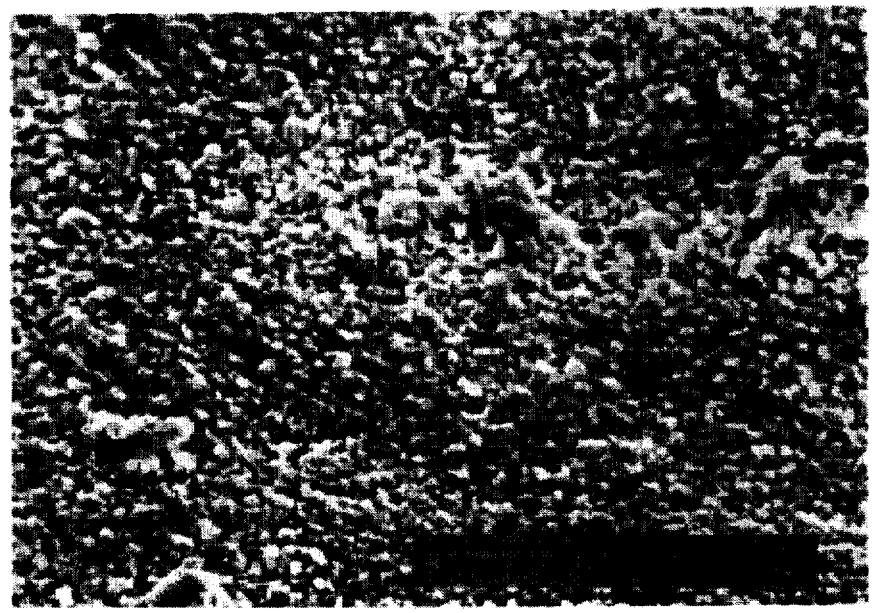

The fine grain effect of a cobalt addition of 0.5% for pure tin (FIGS. 2a/b), for a SnBi5In3 alloy (FIGS. 3a/b), and for a SnAg0.5Sb1.0 alloy (FIGS. 4a/b) is shown. In all cases, a 1–3 μm thick surface layer was applied in a molten manner (hot or dip tinning) to a tin bronze (CuSn6) strip. FIGS. 1 to 4 show the intermetallic phase, each in an enlargement of 5000:1.

TABLE 1

Construction of the IMP in dependency of the Co content.

| Alloy | Grain Size | | | | |
|---|---|---|---|---|---|
| | Without Co | 0.003% Co | 0.03% Co | 0.5% Co | 0.1% Co |
| Sn | 22–33 μm | | | 1.2–4.4 μm | |
| SnBi5In3 | 15–26 μm | | | 3.3–8.8 μm | |
| SnAg0.5Sb0.0 | 15–26 μm | 4–11 μm | 2.2–8.8 μm | 1.2–4.4 μm | |
| SnNi1.4Zn1.24 Ag0.14Sb4.4 | 55.2–16.1 μm | | | | 1.1–4.4 μm |

The particularly fine-granular intermetallic phase results in tin alloy having an improved bendability over the entire tin layer. Compared to pure tin, an improvement, for example, in a tin alloy (Sn0.03% Co), of a hardness of 25 to 40% results, an improvement of the creeping resistance of a maximum of 26%, and a reduction of the E-module of 7 to 14% (compare Table 2) results.

TABLE 2

| | | CuSn6 tinned | | | |
|---|---|---|---|---|---|
| | | Sn-alloy with 0.03% Co 1.3 μm | Sn-alloy with 0.03% Co 4.4 μm | Pure tin 1.1 μm | Pure tin 4.3 μm |
| Hardness N/mm$^2$ | | 1464.57 ± 373 | 394.3 ± 177 | 1047.5 ± 174.5 | 315.5 ± 124 |
| Creeping rate in % after 160 s after power increase | at 4 mN | 18.4 ± 17.51 | 27.72 ± 4.8 | 26.86 ± 4.3 | 26.3 ± 3.7 |
| | at 10 mN | 22.4 ± 11 | 24.02 ± 4.6 | 25.46 ± 7.44 | 25.5 ± 4.5 |
| | at 50 mN | 10.96 ± 3.68 | 22.56 ± 1.6 | 18.27 ± 4.9 | 24.15 ± 1.3 |
| | φ | 17.25 ± 8.2 | 24.76 ± 3.18 | 23.53 ± 5 | 25.3 ± 2.1 |
| E-Module E/(1 − v$^2$)GPa | | 125.5 ± 25.5 | 117.5 ± 16 | 135 ± 28 | 137 ± 6.5 |

The embodiments of the invention in which an exclusive property or privilege is claimed are defined as follows:

1. In a strip-shaped or wire-shaped compound material with a base material of copper or a copper alloy, a moltenly applied surface coating of a tin alloy and an intermetallic phase formed between the surface coating and the base material, the improve- ment comprising the tin alloy consisting of 0.001 to 0.5% cobalt and the balance being tin.

2. The compound material according to claim 1, wherein the tin alloy contains 0.003 to 0.5% cobalt.

3. The compound material according to claim 1, wherein the grain size of the intermetallic phase is 1.1 to 11 μm.

4. The compound material according to claim 3, wherein the grain size of the intermetallic phase is 1.1 to 8.8 μm.

5. The compound material according to claim 1, wherein the grain size of the intermetallic phase does not exceed 15 μm.

6. In a strip-shaped or wire-shaped compound material with a base material of copper or a copper alloy, a moltenly applied surface coating of a tin alloy and an intermetallic phase formed between the surface coating and the base material, the improvement comprising the tin alloy consisting of 0.001 to 0.5% cobalt, up to 10% of at least one member selected from the group consisting of antimony, silver, nickel, zinc, copper, phosphorus, selenium, tellurium, aluminum and iron and the balance being tin.

7. The compound material according to claim 6, wherein at least three members selected from the group consisting of antimony, silver, nickel, zinc, copper, phosphorus, selenium, tellurium, aluminum and iron are contained in the tin alloy.

8. The compound material according to claim 6, wherein at least one member selected from the group consisting of antimony, silver, copper, phosphorus, selenium, tellurium, aluminum and iron are contained in the tin alloy.

9. In a strip-shaped or wire-shaped compound material with a base material of copper or a copper alloy, a moltenly applied surface coating of a tin alloy and an intermetallic phase formed between the surface coating and the base material, the improvement comprising the tin alloy consisting of 0.001 to 0.5% cobalt, a member selected from the group consisting of 0.1 to 57% bismuth and 0.1 to 50% indium and the balance being tin.

10. The compound material according to claim 9, wherein the tin alloy contains a member selected from the group consisting of 0.1 to 20% bismuth and 0.1 to 35% indium.

11. The compound material according to claim 9, wherein the tin alloy contains 0.1 to 50% indium.

12. In a strip-shaped or wire-shaped compound material with a base material of copper or a copper alloy, a moltenly applied surface coating of a tin alloy and an intermetallic phase formed between the surface coating and the base material, the improvement comprising the tin alloy consisting of 0.001 to 0.5% cobalt, 0.1 to 20% bismuth, 0.05 to 35% indium and the balance being tin.

13. The compound material according to claim 12, wherein the tin alloy contains 0.1 to 5% bismuth and 0.05 to 3% indium.

* * * * *